(12) United States Patent
Futamura (10) Patent No.: US 10,279,729 B2
(45) Date of Patent: May 7, 2019

(54) LIGHT CONTROL DEVICE AND LIGHT CONTROL PROGRAM

(71) Applicant: DENSO CORPORATION, Kariya, Aichi-pref. (JP)

(72) Inventor: Shinichi Futamura, Kuwana (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/376,949

(22) PCT Filed: Feb. 4, 2013

(86) PCT No.: PCT/JP2013/052438
§ 371 (c)(1),
(2) Date: Aug. 6, 2014

(87) PCT Pub. No.: WO2013/145859
PCT Pub. Date: Oct. 3, 2013

(65) Prior Publication Data
US 2015/0246633 A1  Sep. 3, 2015

(30) Foreign Application Priority Data
Mar. 28, 2012 (JP) .................. 2012-074640

(51) Int. Cl.
*B60Q 1/06* (2006.01)
*B60Q 1/08* (2006.01)
(Continued)

(52) U.S. Cl.
CPC ............. *B60Q 1/085* (2013.01); *B60Q 1/143* (2013.01); *B60Q 1/16* (2013.01);
(Continued)

(58) Field of Classification Search
CPC .... B60Q 1/08; B60Q 2300/052; B60Q 1/085; B60Q 1/143; B60Q 1/16
See application file for complete search history.

(56) References Cited

U.S. PATENT DOCUMENTS 4,891,559 A * 1/1990 Matsumoto .......... B60Q 1/1423
250/203.1
6,014,207 A * 1/2000 Suzuki ................ B60Q 1/1423
315/77
(Continued)

FOREIGN PATENT DOCUMENTS

JP 2006021631 A 1/2006
JP 2011235678 A 11/2011
(Continued)

OTHER PUBLICATIONS

International Preliminary Report on Patentability dated Oct. 1, 2014 in corresponding PCT Application No. PCT/JP2013/052438.
(Continued)

*Primary Examiner* — Anh T Mai
*Assistant Examiner* — Nathaniel J Lee
(74) *Attorney, Agent, or Firm* — Harness, Dickey & Pierce, P.L.C.

(57) ABSTRACT

In a light control device, positional information of another vehicle present near an own vehicle is acquired. An irradiation area is set based on the position of the other vehicle. Output for changing the irradiation area of a light in the own vehicle is performed to achieve the set irradiation area. The output for changing the irradiation area is prohibited until the elapse of a wait time that has been set in advance are included. According to the light control device, the irradiation area of the light is not changed until the elapse of the wait time. Therefore, annoyance caused by the irradiation area being frequently changed can be suppressed.

13 Claims, 6 Drawing Sheets

(51) Int. Cl.
  *B60Q 1/14*  (2006.01)
  *B60Q 1/16*  (2006.01)
  *B60Q 1/04*  (2006.01)

(52) U.S. Cl.
  CPC .. *B60Q 2300/052* (2013.01); *B60Q 2300/056* (2013.01); *B60Q 2300/112* (2013.01); *B60Q 2300/41* (2013.01); *B60Q 2300/42* (2013.01)

(56) References Cited

U.S. PATENT DOCUMENTS

| | | | |
|---|---|---|---|
| 2008/0129206 A1* | 6/2008 | Stam | B60Q 1/085 315/82 |
| 2012/0206043 A1* | 8/2012 | Yamazaki | B60Q 1/143 315/82 |
| 2013/0155704 A1 | 6/2013 | Takagaki | |

FOREIGN PATENT DOCUMENTS

| | | |
|---|---|---|
| JP | 2012180051 A | 9/2012 |
| WO | WO-2012017559 A1 | 2/2012 |

OTHER PUBLICATIONS

International Search Report (in Japanese with English Translation) for PCT/JP2013/052438, dated Apr. 9, 2013; ISA/JP.

\* cited by examiner

IRRADIATION AREA OF LEFT-SIDE LONG-RANGE LIGHT (PARTIALLY BLOCKED)   IRRADIATION AREA OF SHORT-RANGE LIGHT   IRRADIATION AREA OF RIGHT-SIDE LONG-RANGE LIGHT (PARTIALLY BLOCKED)

LIGHT CONTROL DEVICE AND LIGHT CONTROL PROGRAM

CROSS-REFERENCE TO RELATED APPLICATIONS

This application is a U.S. National Phase Application under 35 U.S.C. 371 of International Application No. PCT/JP2013/052438 filed on Feb. 4, 2013 and published in Japanese as WO 2013145859 A1 on Oct. 3, 2013. This application is based on and claims the benefit of priority from Japanese Patent Application No. 2012-074640, filed Mar. 28, 2012. The entire disclosures of all of the above applications are incorporated herein by reference.

TECHNICAL FIELD

The present invention relates to a light control device and a light control program that control an irradiation area of a light on a vehicle.

BACKGROUND ART

As the above-described light control device, a technology is known in which control is performed so that, when a vehicle is detected, the vehicle is not included in the irradiation area and, when a pedestrian is detected, the pedestrian is included in the irradiation area (refer to, for example, PTL 1).

CITATION LIST

Patent Literature

PTL 1 JP-A-2006-021631

SUMMARY OF INVENTION

Technical Problem

However, in the above-described light control device, a problem occurs in that, when the distance to an oncoming vehicle increases and decreases such as when a plurality of oncoming vehicles pass, the irradiation area of the light frequently changes, causing the driver to experience annoyance.

Therefore, in light of such problems, an object of the present application is to provide a light control device that controls an irradiation area of a light on a vehicle, the light control device being capable of controlling the irradiation area in a manner that does not cause a driver to experience annoyance.

Solution to Problem

To achieve the object such as this, a light control device according to an embodiment of the present application includes: other vehicle information acquiring means for acquiring positional information of another vehicle present near an own vehicle; irradiation area setting means for setting an irradiation area based on the position of the other vehicle; irradiation area change commanding means for performing output for changing the irradiation area of a light in the own vehicle to achieve the set irradiation area; irradiation area change prohibiting means for prohibiting the irradiation area change commanding means from performing the output for changing the irradiation area until the elapse of a wait time that has been set in advance (first aspect of the light control device of the present invention).

The irradiation area change prohibiting means starts clocking the wait time using, as a starting point, a reference timing at which a trigger of some sort is inputted. As the reference timing, for example, an arbitrary reference timing can be set, such as when the irradiation area is set, when the other vehicle information (position or moving direction of the other vehicle) changes, when the state of the own vehicle (such as traveling environment or cruising state) changes, or immediately before the irradiation area change commanding means transitions to irradiation area change. In other words, any configuration is possible as long as the configuration is that in which operation of the irradiation area change commanding means is delayed by the wait time compared to when the irradiation area change prohibiting means is not provided.

According to the light control device such as this, the irradiation area of the light is not changed until the wait time has elapsed. As a result, the irradiation area is not frequently changed, and the driver therefore does not experience annoyance.

In the above-described light control device, the other vehicle information acquiring means may also acquire a moving direction of the other vehicle. In addition, the light control device may further include a wait time setting means for setting the length of the wait time based on the moving direction of the other vehicle (second aspect of the light control device of the present invention).

As a result of such configuration, the light control device can determine whether or not the irradiation area should be quickly changed based on the moving direction of the other vehicle, and the length of the wait time can be set depending on the determination result. Therefore, responsiveness in changing the irradiation area depending on the situation surrounding the own vehicle can be improved.

In addition, the light control device may further include other vehicle determining means for determining whether the other vehicle is an oncoming vehicle traveling towards the own vehicle or a preceding vehicle traveling in the same direction as the own vehicle, based on the moving direction of the other vehicle. The wait time setting means may set the wait time to be shorter when the other vehicle is a preceding vehicle, compared to when the other vehicle is an oncoming vehicle (third aspect of the light control device of the present invention).

In other words, the relative speed in relation to the own vehicle is higher when the other vehicle is an oncoming vehicle, compared to when the other vehicle is a preceding vehicle, and the irradiation area may be frequently changed. Therefore, the wait time is set to be relatively long. On the other hand, the relative speed is low when the other vehicle is a preceding vehicle, and the wait time is set to be short because the irradiation area is unlikely to be frequently changed. As a result of such configuration, the light control device can appropriately set the wait time depending on whether the other vehicle is an oncoming vehicle or a preceding vehicle.

In addition, in the light control device, the irradiation area setting means may be configured to repeatedly set the irradiation area based on the position of the other vehicle so that a light optical axis does not overlap with the other vehicle, within an irradiatable area when a swivel mechanism that changes the light optical axis in a horizontal direction is driven (fourth aspect of the light control device of the present invention).

As a result of such configuration, glare on the other vehicle by the light irradiated from the own vehicle can be effectively prevented.

Furthermore, in the light control device, the irradiation area setting means may set the irradiation area so that the optical axis of one light, of a pair of lights provided in the own vehicle, is positioned on the outer left side of the other vehicle and the optical axis of the other light is positioned on the outer right side of the other vehicle (fifth aspect of the light control device of the invention). According to the light control device such as this, in addition to glare on the other vehicle by the light irradiated from the own vehicle being effectively prevented, the irradiation area can be further widened.

In addition, in the light control device, the irradiation area setting means may I) when another vehicle is present within a reference distance set in advance, set an irradiation area to an irradiatable area of only short-range lights, II) when another vehicle is not present within the reference distance and, when another vehicle is included within the irradiation area assuming that long-range lights are illuminated, set the irradiation area to the irradiatable area of only the short-range lights, while moving the irradiation area in the horizontal direction so that the other vehicle is no longer included in the irradiation area assuming that the long-range lights are illuminated, and III) when another vehicle is not present within the reference distance and, when another vehicle is not included within the irradiation area assuming that long-range lights are illuminated, set the irradiation area to the irradiatable area of the long-range lights. The irradiation area change commanding means may control illumination states of the short-range lights and the long-range lights based on the set irradiation area (sixth aspect of the light control device of the present invention). According to the light control device, the irradiation area can be appropriately enlarged so that glare does not occur on the other vehicle, based on the position of the other vehicle.

Furthermore, in the light control device, the irradiation area setting means may I) when the irradiatable area of the long-range lights is set as the irradiation area and the irradiation area can be set to no longer include another vehicle, set the irradiation area so that the irradiation area no longer includes the other vehicle, and II) when the irradiation area cannot be set so as to no longer include the other vehicle, set the irradiatable area of the short-range lights as the irradiation area (seventh aspect of the light control device of the present invention).

According to the light control device configured in this way, when irradiation is performed by the long-range lights, when glare occurs on the other vehicle regardless of how the irradiation area is set, irradiation can be switched to that by the short-range lights so that glare is less likely to occur on the other vehicle.

In addition, to achieve the above-described object, the present application provides a light control program for enabling a computer to function as each means of the above-described light control device.

As a result of the light control program, the working effects of each aspect of the light control device, described above, can be actualized in the hardware of the light control device.

DESCRIPTION OF EMBODIMENTS

An embodiment of the present invention will hereinafter be described together with the drawings.

Configuration According to the Present Embodiment

Figure 1:
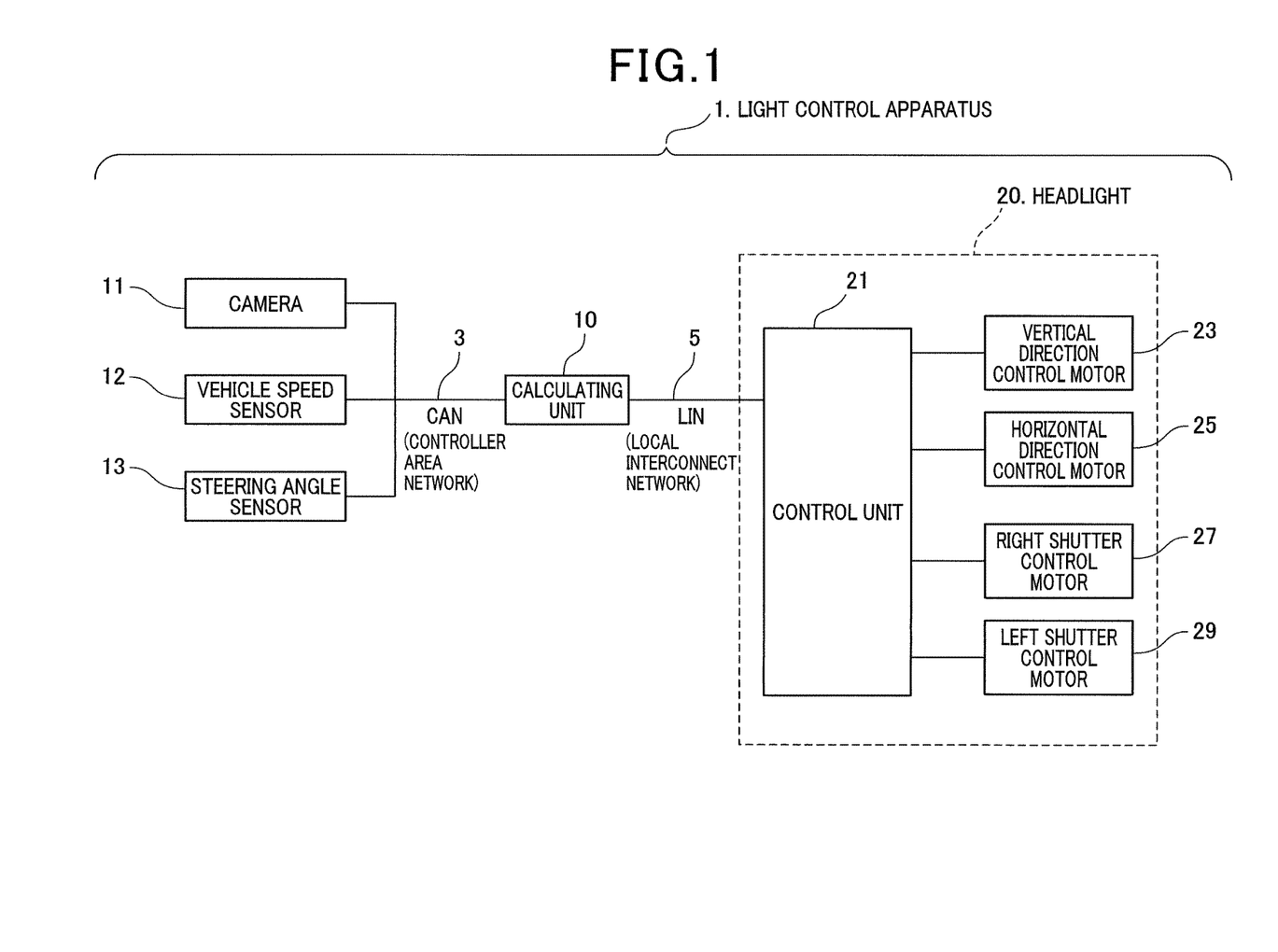
FIG. 1 is a block diagram of an overall configuration of a light control device.

FIG. 1 is a block diagram of an overall configuration of a light control device 1 to which the present invention is applied.

The light control device 1 is a device that is mounted in a vehicle, such as a passenger car. As shown in FIG. 1, in the light control device 1, a camera 11, a vehicle speed sensor 12, and a steering angle sensor 13 are connected to a calculating unit 10 by a controller area network (CAN) communication line 3 over which communication is performed based on CAN communication protocol. The calculating unit 10 is also connected to a local interconnect network (LIN) communication line 5 over which communication is performed based on the LIN communication protocol. The LIN communication line 5 is connected to the headlights 20.

The camera 11 is a digital camera, such as a charge-coupled device (CCD) camera. The camera 11 is disposed inside or outside the vehicle so as to be capable of capturing images of the area ahead of the vehicle. For example, the camera 11 obtains captured images amounting to ten frames per second. The camera 11 uses known processes, such as detecting a pair of lights in a captured image, to extract light sources presumed to be a vehicle and the distance from the own vehicle to the light sources. The camera 11 sends coordinates and distances of the light sources furthest to the right side and furthest to the left side, among the light sources, to the calculating unit 10 via the CAN communication line 3, based on a request from the calculating unit 10.

The vehicle speed sensor 12 is a known vehicle speed sensor. The vehicle speed sensor 12 transmits detection results of the vehicle speed (traveling speed of the vehicle) to the calculating unit 10 via the CAN communication line 3. The steering angle sensor 13 is configured by a known sensor that detects the amount of steering of a steering wheel in the vehicle. The steering angle sensor 13 transmits detection results of the amount of steering (steering angle) to the calculating unit 10 via the CAN communication line 3.

The calculating unit 10 is configured as a known microcomputer including a central processing unit (CPU), a read-only memory (ROM), a random access memory (RAM), and the like. The calculating unit 10 receives the images captured by the camera 11, and the respective detection results from the vehicle speed sensor 12 and the steering angle sensor 13, via the CAN communication line 3. The calculating unit 10 then performs a process for determining an irradiation angle (irradiation area) at which the optical axis of each lamp (light bulb; not shown) of the headlights 20 (also referred to, hereinafter, as simply "optical axis") is to be directed, based on the received captured images and detection results.

Then, the calculating unit 10 transmits, to a control unit 21 of the headlights 20 via the LIN communication line 5, a control command designating the irradiation angle so that the actual optical axis is directed at the determined irradiation angle. Information on the irradiation angle included in the control command includes both angle information in a vertical direction (corresponding to the front/back direction in relation to the traveling direction of the vehicle) and angle information in a horizontal direction perpendicular to the vertical direction (corresponding to the left/right direction in relation to the traveling direction of the vehicle).

In addition, the irradiation angle determined by the calculating unit 10 is a value indicating a difference in angle in relation to a reference angle. The reference angle is an angle set in advance (for example, an angle parallel to the road surface in the vertical direction and an angle in the traveling direction (front direction) of the vehicle in the horizontal direction). In addition, the calculating unit 10 also transmits information designating the positions of shutters 31 and 33, described hereafter, to the control unit 21.

Here, the headlights 20 are disposed in two locations on the left and right in the front portion of the vehicle, as in known vehicles. The control command from the calculating unit 10 is transmitted to both control units 21 of the left and right headlights 20. In FIG. 1, for convenience, only one headlight 20 of the left and right headlights 20 is shown. In addition, a configuration when each lamps (not shown) of the headlights 20 are illuminated is not shown in the drawings.

As shown in FIG. 1, the left and right headlights 20 each include the control unit 21, a vertical direction control motor 23, a horizontal direction control motor 25, a right shutter control motor 27, and a left shutter control motor 29. When the vertical direction control motor 23 is driven, the optical axis is moved in the vertical direction based on the driving. In addition, when the horizontal direction control motor 25 is driven, the optical axis is moved in the horizontal direction based on the driving. Furthermore, the various motors 23, 25, 27, and 29 are configured by, for example, stepping motors.

The control unit 21 is configured as a known microcomputer including a CPU, a ROM, a RAM, and the like. The control unit 21 drives the motors 23, 25, 27, and 29 based on the control commands from the calculating unit 10. In other words, the control unit 21 calculates the difference in angle between the angle of the current optical axis in relation to the reference angle and the irradiation angle included in the control command, based on the information on the irradiation angle included in the control command from the calculating unit 10. The control unit 21 then transmits control signals to the vertical direction control motor 23 and the horizontal direction control motor 25 to make the difference in angle zero. As a result of this process, the angle of the actual optical axis is changed according to the control command from the calculating unit 10.

Figure 2A:
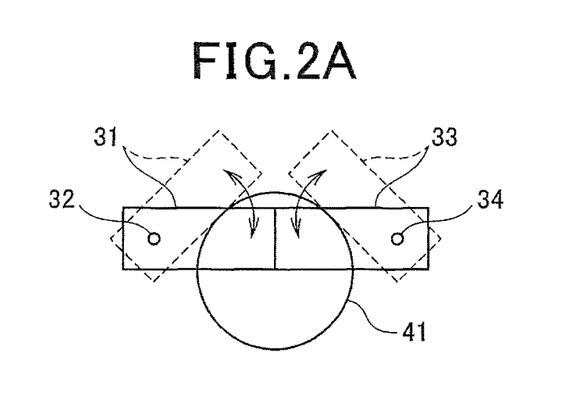
FIG. 2A is an explanatory diagram of a light beam and shutters viewed from the front of a headlight.
Figure 2B:
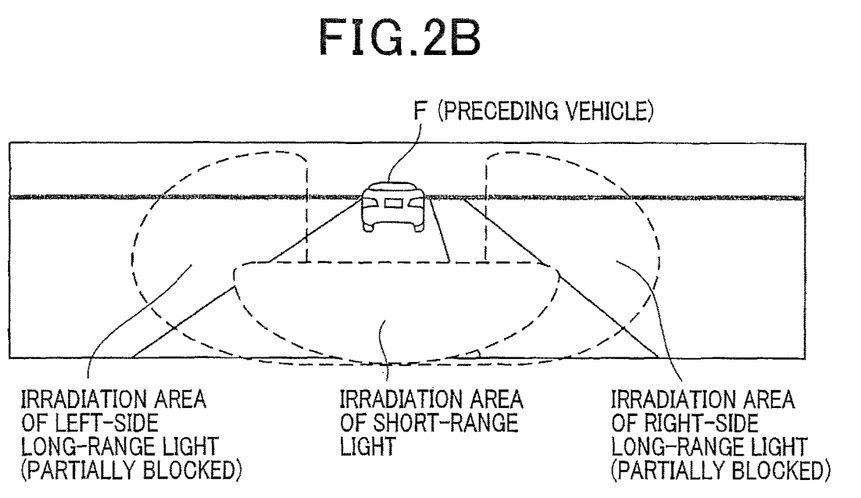
FIG. 2B is an explanatory diagram of when an irradiation area of lamps are restricted by shutters.

In addition, the control unit 21 makes the right shutter control motor 27 drive the right shutter 33 and the left shutter control motor 29 drive the left shutter 31 based on the control commands from the calculating unit 10. Here, the shutters 31 and 33 will be described below with reference to FIG. 2.

As shown in the headlight front perspective view in FIG. 2A, the shutters 31 and 33 are each configured to be capable of blocking and not blocking a portion of a transmission area 41 (irradiation area) through which is transmitted a light beam from the lamp of the headlight 20. Specifically, the shutters 31 and 33 are respectively rotated around rotating shafts 32 and 34 by being driven by the right shutter control motor 27 or the left shutter control motor 29. As a result of the rotation, switching is performed between a state in which a portion of the transmission area 41 is blocked and a state in which a portion of the transmission area 41 is not blocked.

In particular, as the lamps according to the present embodiment, in addition to a short-range light of which the irradiation area encompasses a relatively short range (such as within about a 40 m-area), a long-range light is included of which the irradiation area encompasses a relatively long range (such as within about a 100 m-area). In this configuration example, the shutters 31 and 33 are set to block the irradiation area of the long-range light.

When such shutters 31 and 33 are appropriately controlled, for example, as shown in the front view in the travelling direction of the own vehicle in FIG. 2B, the area indicated by the broken line can be set as the irradiation area of each lamp. In other words, the position of a preceding vehicle (F) can be set outside of the irradiation areas of the lamps, and glare from behind of the preceding vehicle can be prevented. In the example shown in FIG. 2B, a state is indicated in which the long-range lights and the short-range lights are illuminated, and the transmission area 41 is blocked by the right shutter 33 of the long-range light on the left side and the left shutter 31 of the long-range light on the right side.

Figure 3A:
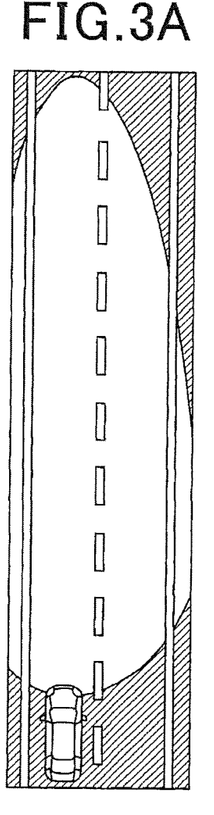
FIGS. 3A to 3C are bird's eye views of irradiation area patterns.
Figure 3B:
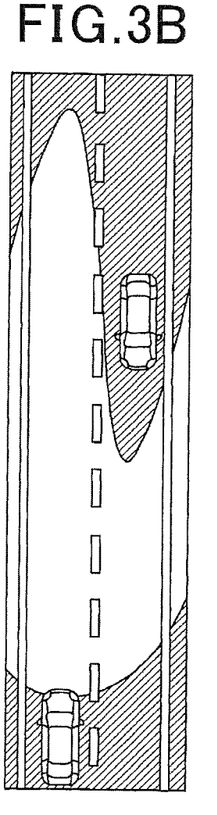
Figure 3C:
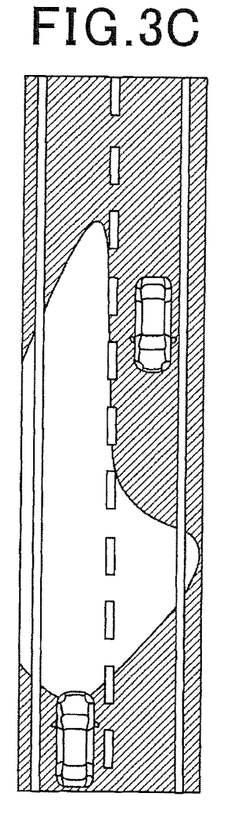

FIGS. 3A to 3C are examples of light distribution patterns (irradiation area patterns) from the own vehicle in relation to an oncoming vehicle. In the light control device 1 of the present configuration, the light distribution patterns (irradiation area patterns) shown in FIGS. 3A to 3C can be generated. For example, the example in FIG. 3A shows a state in which the long-range lights are turned off (an example of a state in which only the left and right short-range lights are illuminated). In addition, the example in FIG. 3B shows a state in which the long-range lights are turned off, the left-side short-range light is moved to the left side by the horizontal direction control motor 25, and the right-side short-range light is moved to the right side by the horizontal direction control motor 25.

Furthermore, the example in FIG. 3C shows a state in which the left-side long-range light is illuminated, and the transmission area 41 is blocked by the right shutter 33 of the left-side long-range light. In addition, the right-side long-range light is illuminated, and the transmission area 41 is blocked by the left shutter 31 of the right-side long-range light.

(Light Control Process)

Figure 4:
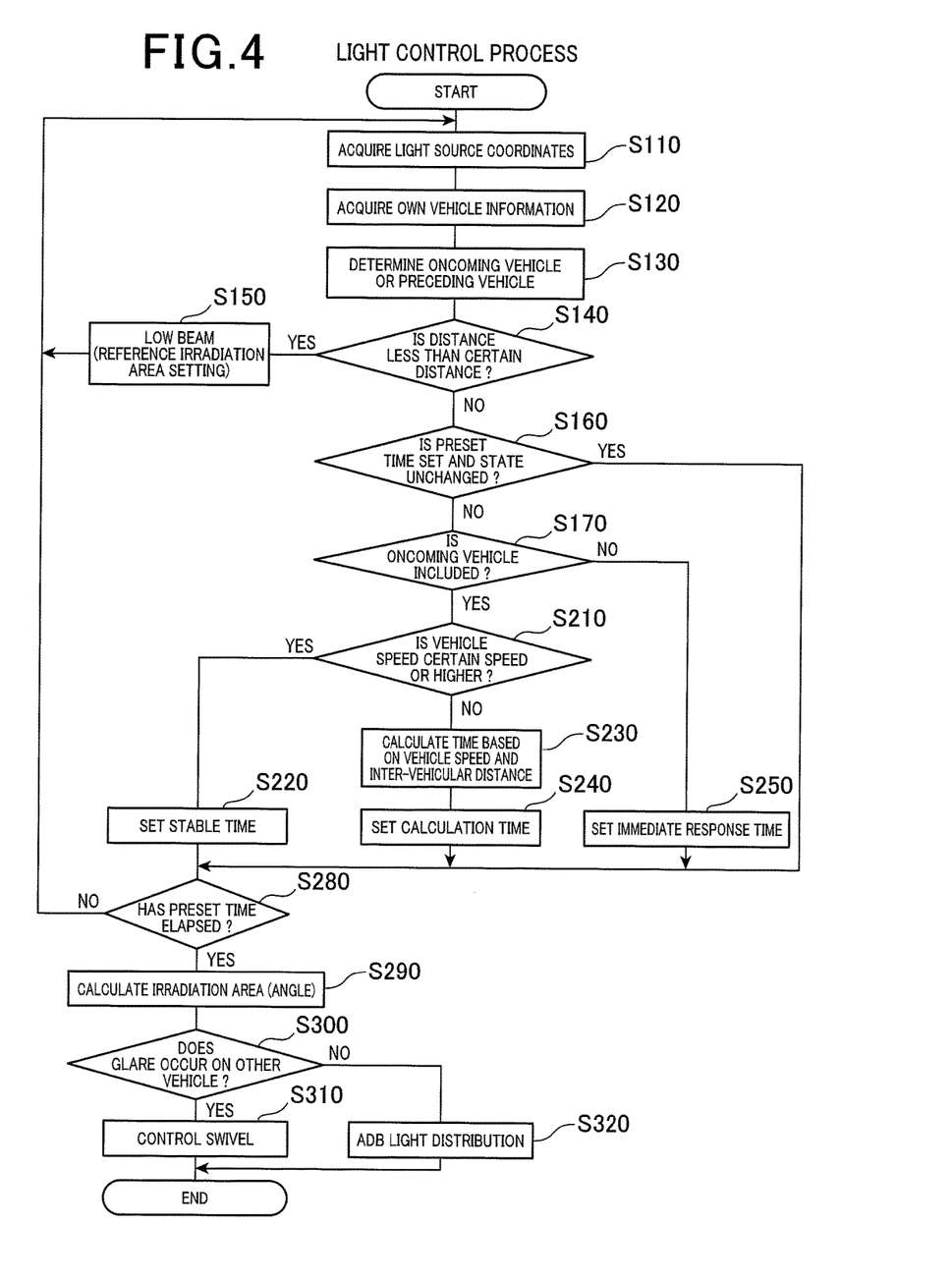
FIG. 4 is a flowchart of a light control process performed by a calculating unit 10.

The calculating unit 10 of such light control device 1 performs a light control process shown in FIG. 4. For example, the light control process is started when the headlights (lamps) of the vehicle are illuminated and is subsequently repeatedly performed until the headlights are turned off. At the start of the light control process, only the short-range lights (low beams) are illuminated.

In the light control process, first, the calculating unit 10 acquires the coordinates of the light sources detected by the camera 11 (S110). In this process, the coordinates (light source coordinates) and the distances to the light source positioned furthest to the left and the light source positioned furthest to the right, among the light sources presumed to be vehicles, are acquired. In addition, in this process, information on the traveling direction of the vehicle (such as the color of the light source) is acquired.

Next, the calculating unit 10 acquires own vehicle information (S120). Here, the own vehicle information includes information on the traveling speed and the steering angle of the own vehicle detected by the vehicle speed sensor 12 and the steering angle sensor 13. Next, the calculating unit 10 determines whether the other vehicle corresponding to the light source coordinates is an oncoming vehicle traveling towards the own vehicle or a preceding vehicle traveling in the same direction as the own vehicle (S130). In this process, the determination is made through use of information such as the positions of the light source coordinates, the traveling direction information (such as white of the headlights or red of taillights), and changes in distance.

Next, the calculating unit 10 compares the distance to the other vehicle with a certain distance that is a distance serving as reference and set in advance (S140). When determined that the distance to the other vehicle is less than the certain distance (outside the operation range of the horizontal direction control motor) (YES at S140), the calculating unit 10 sets an initial state irradiation area (an irradiation area when the short-range lights are illuminated) serving as reference (S150) and returns to the process at S110.

In addition, when the distance to the other vehicle is a certain distance or more (NO at S140), the calculating unit 10 determines whether or not a preset time indicating an immediate response time, a calculation time, or a stable time, described hereafter, is set and the state is unchanged (S160). Here, "the state is changed" indicates when the presence of another vehicle or the type of other vehicle (oncoming vehicle or preceding vehicle) changes, when the type of road on which the own vehicle is traveling (traveling speed for local roads or high-speed cruising on highways and the like) changes, and the like, between when S160 is previously performed and the current process at S160.

When the preset time is set and the state is unchanged (YES at S160), the calculating unit 10 proceeds to the process at S280, described hereafter. In addition, when the preset time is not set or the state is changed (NO at S160), the calculating unit 10 determines whether or not an oncoming vehicle is included in the other vehicles (S170).

When determined that an oncoming vehicle is not included in the other vehicles (NO at S170), the calculating unit 10 sets an immediate response time (S250) and proceeds to the process at S280. Here, for example, the immediate response time is set to about zero to one second. When the immediate response time is set, the irradiation area of the headlights 20 can be changed almost instantly.

In addition, when determined that an oncoming vehicle is included in the other vehicles (YES at S170), the calculating unit 10 determines whether or not the traveling speed of the own vehicle is a certain speed that is set in advance or higher (S210). In this determination, whether or not the traveling speed is a reference speed (such as 80 km/h) or higher is detected.

When determined that the speed of the own vehicle is a certain speed or higher (YES at S210), the calculating unit 10 sets the stable time (S220) and proceeds to the process at S280. Here, for example, the stable time is set to about five to ten seconds, which is an amount of time that is the same as or longer than the above-described immediate response time and calculation time.

In addition, when determined that the speed of the own vehicle is less than the predefined speed (NO at S210), the calculating unit 10 calculates an amount of time based on the vehicle speed of the own vehicle and the inter-vehicular distance to the other vehicle (S230). The calculating unit 10 then sets the amount of time as the calculation time (S240). Here, in the process at S230, the calculation time is set to become longer as the vehicle speed of the own vehicle becomes higher. In addition, the calculation time is set to become longer as the inter-vehicular distance becomes shorter. For example, the calculation time is set to an amount of time between zero to five seconds.

Next, the calculating unit 10 determines whether or not the preset time (immediate response time, calculation time, or stable time) has elapsed (S280). When determined that the preset time has not elapsed (NO at S280), the calculating unit 10 returns to the process at S110. In other words, output for changing the irradiation area is prohibited until the preset time has elapsed.

In addition, when determined that the preset time has elapsed (YES at S280), the calculating unit 10 sets the irradiation area of the lamps by setting the irradiation angles (leveling angle and swivel angle) (S290). In this process, the irradiation area is set based on the position of the other vehicle so that the direction of the optical axis of the long-range light does not overlap with the other vehicle, within an irradiatable area when a swivel mechanism is driven that changes the direction of the optical axis of the light in the horizontal direction (condition 1).

At this time, the irradiation area is set so that the optical axis of the left headlight provided in the own vehicle is positioned on the outer left side of the other vehicle and the optical axis of the right headlight is positioned on the outer right side of the other vehicle (condition 2). Here, in this process, the positions of the above-described shutters 31 and 33 are also set so that the position of the other vehicle is not within the irradiation area of the long-range lights. When the irradiation area cannot be set to meet the conditions 1 and 2, described above, the irradiation angle for maximum swivel angle is set.

Next, the calculating unit 10 determines whether or not glare occurs on the other vehicle when the long-range lights are illuminated under the current irradiation area setting (S300). In other words, whether or not the irradiation area meets the above-described conditions 1 and 2 is determined.

When determined that glare occurs on the other vehicle (YES at S300), the calculating unit 10 instructs the headlights 20 to perform ordinary swivel control (a process for controlling the swivel angle based on speed and steering angle) while illuminating only the short-range lights (S310) and ends the light control process.

In addition, when determined that glare does not occur on the other vehicle, the calculating unit 10 instructs the headlights 20 to manipulate the direction of the optical axis and the shutters 31 and 33 so that the set irradiation area is achieved, with light distribution such that only the position of the other vehicle is blocked while illuminating the long-range lights, or so-called adaptive driving beam (ADB) light distribution (S320) and ends the light control process. At this time, to further suppress glare on the other vehicle, the long-range lights may be illuminated after the directions of the optical axes of the long-range lights are sufficiently moved to the outer sides (the right side for the right-side headlight and the left side for the left-side headlight).

Figure 5A:
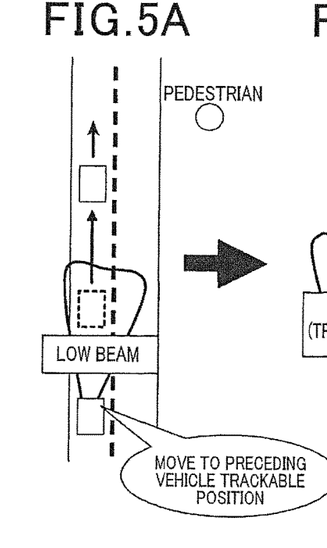
FIGS. 5A to 5C are explanatory diagrams of an irradiation format when a preceding vehicle is present.
Figures 5B, 5C:
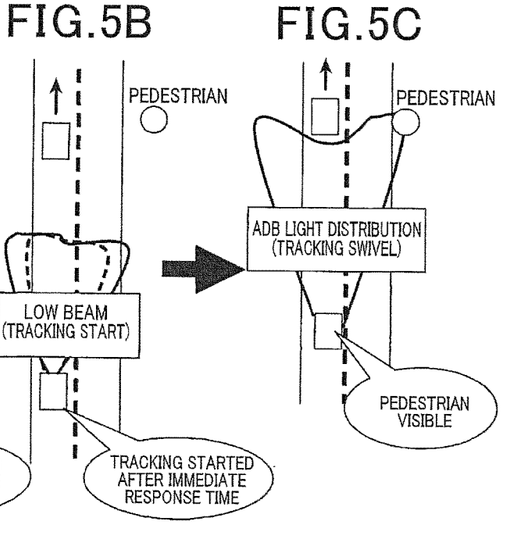

When such process is performed, for example, when a preceding vehicle is present, as shown in FIGS. 5A to 5C, first, irradiation is performed by the short-range lights (low beams) when the distance to the preceding vehicle is relatively close (FIG. 5A). Then, when the distance to the preceding vehicle widens, the elapse of the stable time is awaited. Subsequently, irradiation is performed by the short-range lights while the irradiation area is moved in the horizontal direction so that, when illumination of the long-range lights is presumed, the irradiation area thereof does not include the other vehicle (FIG. 5B). Furthermore, when the irradiation area does not include the other vehicle when illumination of the long-range lights is presumed (when the swivel angle is relatively large), illumination is performed by the long-range lights (FIG. 5C).

Figure 6A:
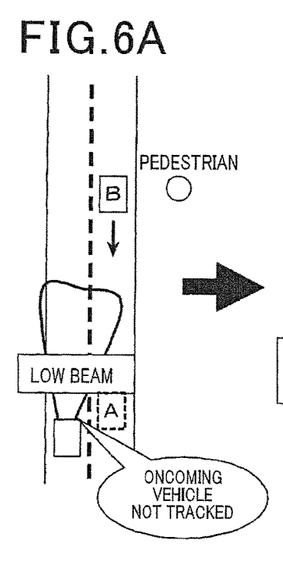
FIGS. 6A to 6C are explanatory diagrams of an irradiation format when an oncoming vehicle is present.
Figures 6B, 6C:
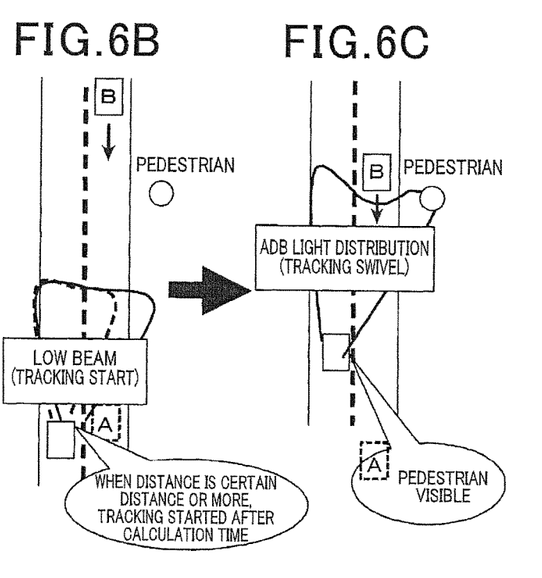

In addition, for example, when an oncoming vehicle is present, as shown in FIGS. 6A to 6C, first, irradiation is performed by the short-range lights (low beams) when the distance to the oncoming vehicle is relatively close (FIG. 6A). Then, when the oncoming vehicle passes and the distance to the next oncoming vehicle is relatively far, the elapse of the immediate response time or the calculation time is awaited. Subsequently, irradiation is performed by the short-range lights while the irradiation area is moved in the horizontal direction so that, when illumination of the long-range lights is presumed, the irradiation area thereof does not include the other vehicle (FIG. 6B).

Furthermore, when the irradiation area does not include the other vehicle when illumination of the long-range lights is presumed, irradiation is performed by the long-range lights (FIG. 6C). In this instance, when the oncoming vehicle approaches and enters the irradiation area of the long-range lights, irradiation by the long-range lights is ended. In other words, irradiation is performed only by the short-range lights.

Figure 7A:
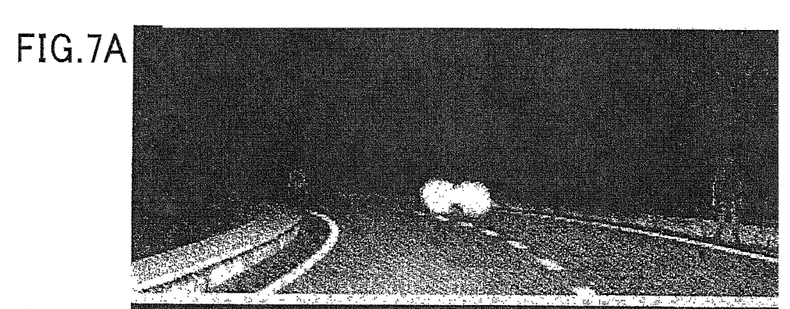
FIGS. 7A and 7B are explanatory diagrams of the effects of the light control process.
Figure 7B:
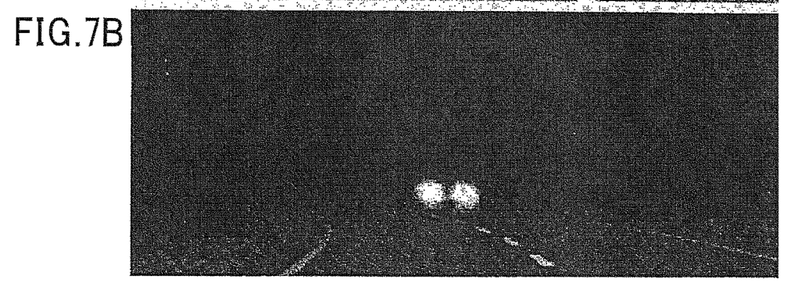

As shown in FIG. 6C, when, in a state in which an oncoming vehicle is present, an area excluding the oncoming vehicle is irradiated by the long-range lights, as shown in FIG. 7A, visual confirmation of pedestrians walking on the side of the road and obstacles near the road can be facilitated. FIG. 7B shows an example in which irradiation is performed by only the short-range lights in a situation similar to that in FIG. 7A. In this example, it is clear that visual confirmation of pedestrians and obstacles is difficult.

Advantageous Effects According to the Embodiment

In the light control device 1 described in detail above, the calculating unit 10 acquires the positional information of another vehicle present near the own vehicle and sets the irradiation area based on the position of the other vehicle. Then, the calculating unit 10 performs change output for changing the irradiation area of the lights of the own vehicle so as to be the set irradiation area. Furthermore, the calculating unit 10 prohibits output for changing the irradiation area until the elapse of the wait time that is set in advance.

In the light control device 1 such as this, the irradiation area of the light is not changed until the wait time has elapsed. Therefore, annoyance experienced by the driver as a result of the irradiation area being frequently changed can be suppressed.

In addition, in the light control device 1, the calculating unit 10 also acquires the moving direction of the other vehicle and sets the length of the wait time based on the moving direction of the other vehicle. According to the light control device 1 such as this, whether or not the irradiation area should be quickly changed can be determined based on the moving direction of the other vehicle, and the length of the wait time can be set depending on the determination result. Therefore, responsiveness in changing the irradiation area can be set depending on the situation.

Furthermore, in the light control device 1, the calculating unit 10 determines whether the other vehicle is an oncoming vehicle traveling towards the own vehicle or a preceding vehicle traveling in the same direction as the own vehicle, based on the moving direction of the other vehicle. The wait time is set to be shorter when the other vehicle is a preceding vehicle, compared to when the other vehicle is an oncoming vehicle. According to the light control device 1 such as this, the wait time can be appropriately set depending on whether the other vehicle is an oncoming vehicle or a preceding vehicle.

In addition, in the above-described light control device 1, the calculating unit 10 repeatedly sets the irradiation area based on the position of the other vehicle so that the direction of the optical axis of the light does not overlap with the other vehicle, within the irradiatable area when the swivel mechanism for changing the direction of the optical axis of the light in the horizontal direction is driven.

According to the light control device 1 such as this, the position of the other vehicle can be tracked and the irradiation area can be set within an irradiatable area of when the swivel mechanism is used, so that glare is not likely to occur on the other vehicle. The optical axis direction can then be changed to achieve the irradiation area.

Furthermore, in the above-described light control device 1, the calculating unit 10 sets the irradiation area so that the optical axis of one light, of the pair of lights provided in the own vehicle, is positioned on the outer left side of the other vehicle and the optical axis of the other light is positioned on the outer right side of the outer vehicle. According to the light control device 1 such as this, a wider area can be set as the irradiation area.

In addition, in the above-described light control device 1, the calculating unit 10 I) when another vehicle is present within a reference distance set in advance, sets the irradiatable area of only the short-range lights as the irradiation area. In addition, II) when another vehicle is not present within the reference distance and, when illumination by the long-range lights is presumed, another vehicle is included within the irradiation area thereof, the calculating unit 10 sets the irradiatable area of only the short-range lights as the irradiation area of the long-range lights, while moving the irradiation area in the horizontal direction so that the other vehicle is no longer included in the irradiation area when illumination of the long-range lights is presumed. Furthermore, III) when another vehicle is not present within the reference distance and, when illumination by the long-range lights is presumed, another vehicle is not included within the irradiation area thereof, the calculating unit 10 sets the irradiatable area of the long-range lights as the irradiation area. The illumination states of the short-range lights and the long-range lights are controlled based on the set irradiation area.

According to the light control device 1 such as this, the irradiation area can be appropriately widened so that glare does not occur on the other vehicle, depending on the position of the other vehicle. Furthermore, when the irradiatable area of the long-range lights is set as the irradiation area and the irradiation area can be set to no longer include another vehicle, the calculating unit 10 sets the irradiation area so that the irradiation area no longer includes the other vehicle. When the irradiation area includes another vehicle, the calculating unit 10 sets the irradiatable area of the short-range lights as the irradiation area.

According to the light control device 1 such as this, when irradiation is performed by the long-range lights, when glare occurs on the other vehicle regardless of how the irradiation area is set, irradiation is switched to that by the short-range lights so that glare is less likely to occur on the other vehicle.

Other Embodiments [Variation Examples]

The embodiments of the present invention are not limited in any way to the above-described embodiment. Various embodiments are possible within the technical scope of the present invention.

For example, according to the above-described embodiment, the camera 11 is configured to perform the process for extracting light sources presumed to be a vehicle from the captured image and detecting the distance, and the process for detecting the coordinates of the light sources furthest to the right side and furthest to the left side. However, at least a part of these processes may be performed by the calculating unit 10. In this instance, for example, the camera 11 may transmit the captured images as is to the calculating unit 10.

In addition, according to the above-described embodiment, the same preset time (immediate response time, calculation time, or stable time) is set for the left and right headlights 20. However, differing preset times may be set for the left and right headlights 20.

Furthermore, according to the above-described embodiment, the headlights 20 each include the long-range lights and the short-range lights. However, the headlights 20 may be configured to include only the long-range lights. In this instance, when light is distributed at a close distance, the transmission area 41 is merely required to be blocked by the left and right shutters 31 and 33.

Relationship Between the Embodiment and the Scope of Claims

The processes at S110 to S130 according to the embodiment correspond to an "other vehicle information acquiring means" in the scope of the claims. The process at S130 according to the embodiment corresponds to an "other vehicle determining means" in the scope of the claims. The processes at S150 and S190 correspond to an "irradiation area setting means" in the scope of the claims. The processes at S310 and S320 according to the embodiment correspond to an "irradiation area change outputting means" in the scope of the claims.

Furthermore, the process at S280 according to the embodiment corresponds to an "irradiation area change prohibiting means" in the scope of the claims. The processes at S170 to S250 according to the embodiment correspond to a "wait time setting means" in the scope of the claims.

REFERENCE SIGNS LIST

1: light control device
3: CAN communication line
5: LIN communication line
10: calculating unit
11: camera
12: vehicle speed sensor
13: steering angle sensor
20: headlight
21: control unit
23: vertical direction control motor
25: horizontal direction control motor
27: right shutter control motor
29: left shutter control motor
31: left shutter
33: right shutter
41 transmission area

What is claimed is:

1. A light control device comprising:
other vehicle information acquiring means for acquiring a position of another vehicle present near an own vehicle in which the light control device is mounted, and also acquiring a moving direction of the other vehicle;
irradiation area setting means for setting an irradiation area of a light mounted in the own vehicle, based on the position of the other vehicle, the irradiation area of the light being changeable in at least a horizontal direction of the own vehicle;
irradiation area change commanding means for commanding the light to change the irradiation area of the light of the own vehicle such that the set irradiation area is achieved;
irradiation area change prohibiting means for prohibiting the change commanding means from changing the irradiation area until a wait time elapses, the wait time being changeable; and
wait time setting means for setting a length of the wait time based on the moving direction of the other vehicle, wherein:
the light mounted in the own vehicle is a headlight;
the other vehicle information acquiring means includes another vehicle determining means for determining whether the other vehicle is an oncoming vehicle traveling towards the own vehicle or a preceding vehicle traveling in the same direction as the own vehicle, based on the moving direction of the other vehicle;
the another vehicle determining means determines whether the other vehicle is the oncoming vehicle or the preceding vehicle based on a color of a light source of the other vehicle detected by a camera provided in the own vehicle, determines that the other vehicle is the oncoming vehicle when the color of the light source of the other vehicle is a white color of a headlight, and determines that that the other vehicle is the preceding vehicle when the color of the light source of the other vehicle is an red color of a tail light;
the wait time setting means sets a length of the wait time to be shorter when the other vehicle is a preceding vehicle, compared to when the other vehicle is an oncoming vehicle; and
the wait time setting means sets the length of the wait time to be a first time period in response to the another vehicle determining means determining that the other vehicle is the oncoming vehicle traveling towards the own vehicle and sets the length of the wait time to be a second time period in response to the another vehicle determining means determining that the other vehicle is the preceding vehicle traveling in the same direction as the own vehicle, wherein the second time period is shorter than the first time period.

2. The light control device according to claim 1, wherein:
the irradiation area setting means repeatedly sets the irradiation area based on the position of the other vehicle so that a light optical axis does not overlap with the other vehicle, within an irradiatable area when a swivel mechanism that changes the light optical axis in the horizontal direction is driven.

3. The light control device according to claim 2, wherein:
the irradiation area setting means sets the irradiation area so that the optical axis of one headlight, of a pair of headlights provided in the own vehicle, is positioned on the left side of the other vehicle and the optical axis of another headlight is positioned on the right side of the other vehicle.

4. The light control device according to claim 3, wherein: the irradiation area setting means
I) when another vehicle is present within a reference distance set in advance, sets an irradiation area to an irradiatable area of only short-range lights,
II) when another vehicle is not present within the reference distance and, when another vehicle is included within the irradiation area assuming that long-range lights are illuminated, sets the irradiation area to the irradiatable area of only the short-range lights, while moving the irradiation area in the horizontal direction so that the other vehicle is no longer included in the irradiation area assuming that the long-range lights are illuminated, and
III) when another vehicle is not present within the reference distance and, when another vehicle is not included within the irradiation area assuming that illumination by the long-range lights are illuminated, sets the irradiation area to the irradiatable area of the long-range lights; and
the irradiation area change commanding means controls illumination states of the short-range lights and the long-range lights based on the set irradiation area.

5. The light control device according to claim 2, wherein: the irradiation area setting means
I) when another vehicle is present within a reference distance set in advance, sets an irradiation area to an irradiatable area of only short-range lights,
II) when another vehicle is not present within the reference distance and, when another vehicle is included within the irradiation area assuming that long-range lights are illuminated, sets the irradiation area to the irradiatable area of only the short-range lights, while moving the irradiation area in the horizontal direction so that the other vehicle is no longer included in the irradiation area assuming that the long-range lights are illuminated, and
III) when another vehicle is not present within the reference distance and, when another vehicle is not included within the irradiation area assuming that illumination by the long-range lights are illuminated, sets the irradiation area to the irradiatable area of the long-range lights; and
the irradiation area change commanding means controls illumination states of the short-range lights and the long-range lights based on the set irradiation area.

6. The light control device according to claim 5, wherein: the irradiation area setting means
I) when the irradiatable area of the long-range lights is set as the irradiation area and the irradiation area can be set to no longer include another vehicle, sets the irradiation area so that the irradiation area no longer includes the other vehicle, and
II) when the irradiation area cannot be set so as to no longer include the other vehicle, sets the irradiatable area of the short-range lights as the irradiation area.

7. The light control device according to claim 1, wherein: the irradiation area setting means repeatedly sets the irradiation area based on the position of the other vehicle so that a light optical axis does not overlap with the other vehicle, within an irradiatable area when a swivel mechanism that changes the light optical axis in the horizontal direction is driven.

8. The light control device according to claim 1, wherein the second time period is set to between zero and one second.

9. The light control device according to claim 1, wherein the first time period is set to between five and ten seconds.

10. The light control device according to claim 1, wherein the wait time setting means sets the first time period based on a speed of the own vehicle, sets the first time period to between five and ten seconds when the speed of the own vehicle is greater than a speed threshold, and sets the first time period to between the second time period and five seconds when the speed of the own vehicle is less than the speed threshold.

11. A non-transitory computer-readable storage medium storing a light control program for causing a computer to function as:
other vehicle information acquiring means for acquiring a position of another vehicle present near an own vehicle in which the light control device is mounted, and also acquiring a moving direction of the other vehicle;
irradiation area setting means for setting an irradiation area of a light mounted in the own vehicle, based on the position of the other vehicle, the irradiation area of the light being changeable in at least a horizontal direction of the own vehicle;
irradiation area change commanding means for commanding the light to change the irradiation area of the light of the own vehicle such that the set irradiation area is achieved;
irradiation area change prohibiting means for prohibiting the change commanding means from changing the irradiation area until a wait time elapses, the wait time being changeable; and
wait time setting means for setting a length of the wait time based on the moving direction of the other vehicle, wherein:
the light mounted in the own vehicle is a headlight;
the other vehicle information acquiring means includes another vehicle determining means for determining whether the other vehicle is an oncoming vehicle traveling towards the own vehicle or a preceding vehicle traveling in the same direction as the own vehicle, based on the moving direction of the other vehicle;
the another vehicle determining means determines whether the other vehicle is the oncoming vehicle or the preceding vehicle based on a color of a light source of the other vehicle detected by a camera provided in the own vehicle, determines that the other vehicle is the oncoming vehicle when the color of the light source of the other vehicle is a white color of a headlight, and determines that that the other vehicle is the preceding vehicle when the color of the light source of the other vehicle is an red color of a tail light; and
the wait time setting means sets a length of the wait time to be shorter when the other vehicle is a preceding vehicle, compared to when the other vehicle is an oncoming vehicle.

12. An apparatus to be provided in a vehicle to control an irradiation area irradiated from a light device of the vehicle, the apparatus comprising:
a processor configured to implement the steps of:
acquiring a position of another vehicle present near a own vehicle in which the light control device is mounted, and also acquiring a moving direction of the other vehicle;

setting an irradiation area of a light mounted in the own vehicle, based on the position of the other vehicle, the irradiation area of the light being changeable in at least a horizontal direction of the vehicle;

commanding means for commanding the light to change the irradiation area of the light of the own vehicle such that the set irradiation area is achieved;

setting a duration of a wait time based on the moving direction of the other vehicle, the wait time being changeable; and prohibiting the change commanding means from changing the irradiation area until the wait time elapses, wherein:

the light mounted in the own vehicle is a headlight;

the step of acquiring includes the step of determining whether the other vehicle is an oncoming vehicle traveling towards the own vehicle or a preceding vehicle traveling in the same direction as the own vehicle, based on the moving direction of the other vehicle;

the step of determining determines whether the other vehicle is the oncoming vehicle or the preceding vehicle based on a color of a light source of the other vehicle detected by a camera provided in the own vehicle, determines that the other vehicle is the oncoming vehicle when the color of the light source of the other vehicle is a white color of a headlight, and determines that that the other vehicle is the preceding vehicle when the color of the light source of the other vehicle is an red color of a tail light; and the step of setting sets a length of the wait time to be shorter when the other vehicle is a preceding vehicle, compared to when the other vehicle is an oncoming vehicle.

13. An apparatus to be provided in an own vehicle to control an irradiation area of a head light of the own vehicle, the apparatus comprising:
a camera that captures an image of a forward field of the own vehicle; and
a processor configured to:
determine if an oncoming vehicle or a preceding vehicle is present near the own vehicle at least based on white and red colors of lights in the image captured by the camera; and
output a signal for changing a duration of a wait time based on if there is an oncoming vehicle or a preceding vehicle,
the duration of the wait time being a time duration from a first time point when the own vehicle detects an oncoming vehicle or a preceding vehicle to a second time point when the own vehicle changes the irradiation area of the head lamp, and
the duration of the wait time being set to be shorter when the processor detects a preceding vehicle, than the duration of the wait time when the processor detects an oncoming vehicle.

* * * * *